3,290,267
REINFORCED THERMOPLASTIC COMPOSITIONS AND PROCESS OF PRODUCING SAME
Byron M. Vanderbilt and Robert E. Clayton, Westfield, Union, N.J., assignors to Esso Research and Engineering Company, a corporation of Delaware
Filed Dec. 28, 1964, Ser. No. 421,546
11 Claims. (Cl. 260—41)

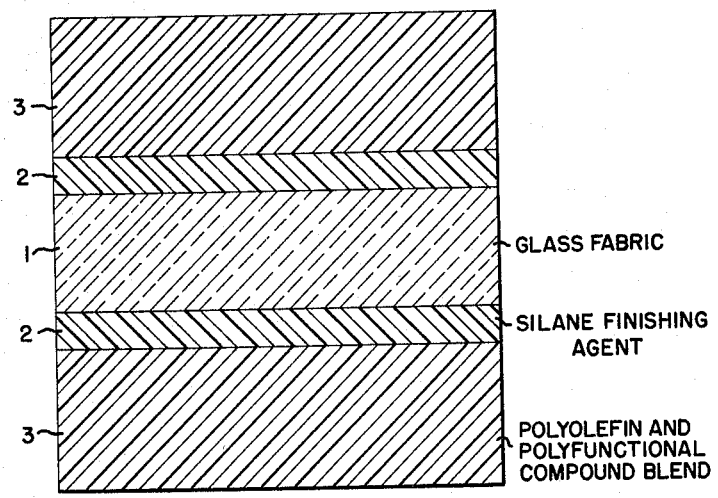

This application is a continuation-in-part of our co-pending application, Serial No. 209,973, filed July 16, 1962, which in turn is a continuation-in-part of our now abandoned application, Serial No. 135,064, filed August 30, 1961.

This invention relates to a process for increasing the strength of a thermoplastic or rubber-like polyolefin through the use of novel processing techniques and reagents and through the use of a plurality of reinforcing agents and reinforcing fillers which have been treated or coated with silicon-containing compounds and multiolefinic compounds to enhance their adhesion to the polyolefins.

More particularly, it is concerned with a unitary reinforced product in which the aforementioned polyolefin is bonded to a siliceous surface which may be of a siliceous filler-type or glass fiber material.

It is known to polymerize an alkene monomer, e.g., ethylene, under pressure using oxygen as catalyst to prepare "low density" polyethylene. It is also known to employ a low pressure-complex metal catalyst to form "high density" polyethylene. In the past, as per U.S. Patent No. 2,930,083, this polyolefin has been crosslinked by means of a peroxide to provide a material which is stronger and more rubber-like than the original polyolefin or polyolefin copolymer. However, the strength, e.g., tensile strength, of the end products therefrom has been too low for many commercial uses, e.g., belting, piping, hose, tires, tubes, electrical insulation and mechanical goods which are subjected to elevated temperatures, abrasion, and/or shearing conditions. Furthermore, it has not been possible to strongly adhere the aforementioned olefinic polymers and copolymers to siliceous surfaces, e.g., glass fibers or finely divided silica.

It has now been discovered, inter alia, that the tensile strength of a polyolefin can be substantially increased by curing the same in the presence of and in contact with a polyfunctional monomer, e.g., divinyl benzene or a polyfunctional low molecular weight polymer, either normally liquid or solid, coated onto siliceous surfaces in conjunction with a peroxide catalyst. Although U.S. Patent Nos. 2,388,138 and 2,526,773 are concerned with the copolymerization of ethylene with divinyl benzene and the like, there is no correlation nor equivalency between the reaction of divinyl benzene with monomeric ethylene and the crosslinking of a polymer of ethylene with divinyl benzene to provide the superior thermoplastic or rubber-like products herein. Furthermore, a polyfunctional monomer or a polyfunctional further polymerizable polymer, for example, divinyl benzene, ethylene dimethacrylate, normally liquid butadiene polymeric oils, normally liquid butadiene-styrene copolymeric oils, normally solid butadiene-styrene copolymer resins containing predominantly olefinic unsaturation remaining after 1,2-type polymerization of the conjugated diolefin, and the like, have been found effective for increasing the rate of cure, increasing the extent of curing the alpha olefinic polymers or copolymers, and in reducing the amount of curing agents required without sacrificing desirable tensile strength and elongation properties. This last property, however, is most apparent in cases where polyfunctional polymeric compounds are employed. Corresponding monofunctional monomers are entirely ineffective or even detrimental in some cases when used in a similar manner insofar as attaining improved tensile strength and elongation properties are concerned. The polyfunctional monomers and polymers have also been found to greatly increase the adhesive bond between the olefinic polymers and the siliceous surfaces which have previously been treated with a chrome or silane finish and then treated with these polyfunctional compounds, or have been treated with an admixture of silane or silanol and the polyfunctional compounds. The use of the terms "polyfunctional monomer" and "polyfunctional polymer" or equivalent terms in the specification and accompanying claims is intended to cover compounds containing at least two ethylenically unsaturated carbon-to-carbon linkages per molecule, such as two or more vinyl groups or two or more propenyl groups, and the like. Polymeric compounds resulting from 1,2-type polymerizations and containing at least 50% of their molecules containing such vinyl type groupings are useful. Such compounds having number average molecular weights of 15,000 or less are preferred.

Thus, in accordance with one embodiment of the instant invention, a polyalpha olefin, or as is sometimes stated, the polymers of 1-olefins, are prepared in conventional manner and are compounded with one or more polyfunctional compounds, either monomers or polymers, and are contacted with siliceous surfaces (preferably previously or simultaneously treated with a silane or its corresponding silanol or polysiloxane), either during the compounding or later, but in any event prior to any curing operation, and are then cured in the presence of any free radical catalyst, i.e., a free radical organic peroxide catalyst, such as dicumyl peroxide, benzoyl peroxide, 2,5-dimethyl-2,5-di(tertiary butyl peroxy) hexane, etc., to form reinforced plastic compositions of increased tensile strength.

The polyolefins herein employed may be of thermoplastic nature (homopolymers) or they may be of the rubbery (copolymer) type formed from alpha alkenes or 1-alkene monomers containing from 2 to 12 carbon atoms per molecule, e.g., ethylene, propylene, butene-1, pentene-1, ethylene and propylene admixtures, ethylene and butene-1 admixtures, ethylene and pentene-1 admixtures. Polyethylene, polypropylene and the rubbery copolymer of ethylene with propylene are three of the preferred materials. These are conventional and well known materials and are prepared in conventional manner. They may be of either amorphous, crystalline, or mixed character. Conventional methods of preparing low pressure polyethylene employ pressures of 0–500 p.s.i.g. and temperatures of 0 to 100° C. using conventional metallo alkyl catalysts which are solid, insoluble reaction products obtained by reducing a reducible heavy transition metal compound, the metal component of which is taken from Groups IV–B, VI–B or VIII or manganese with a reducing organo metallic compound of an alkali metal, alkaline earth metal, rare earth or zinc metal compound. The catalyst can also be prepared by reducing an appropriate metal compound with either metallic aluminum, or a mixture of aluminum and titanium, or the like. The preferred catalyst of this type is usually prepared by reducing one mole of a titanium tetrahalide, preferably tetrachloride, to the corresponding trivalent titanium halide with about 0.2 to 6 moles of either aluminum triethyl or aluminum triisobutyl or other aluminum alkyl compound of the formula RR'ALX wherein R, R', and X preferably are alkyl groups having from 2 to 8 carbon atoms, although X can be hydrogen or halogen, preferably chlorine. In addition to the catalyst, an inert hydrocarbon solvent, which is preferably a $C_3$ to $C_{18}$ paraffin, e.g., isopentane, n-heptane, and the like, may be used as a diluent in the polymerization. The end product, e.g., polyethylene, generally has a number average molecular weight in the range of 12,000 to 500,000 or more. These polyolefins are discussed in detail in the Belgian Patent No. 533,362; Chemical & Engineering News, April 8, 1957, pages 12 to 16; and Petroleum Refiner, December 1956, pages 191 through 196, the subject matter of which is incorporated herein by reference. This invention is also applicable to low density polyolefin (polyethylene) made by the polymerization of the corresponding alpha olefin at about 100° to 400° C., under high pressure, e.g., 500 to 3,000 atmospheres, and preferably with a controlled trace of oxygen as catalyst, to provide a product with an average molecular weight between 50,000 and 500,000 by the melt index method. As used herein and in the appended claims, the term "polymer" is intended to include the copolymers as well.

The polyfunctional or unsaturated compound employed is either monomeric or polymeric and contains two or more terminal ethylenically unsaturated carbon-to-carbon linkages per molecule. They are linkages or functional groups acting independently of each other. Typical types of compounds which may be employed are the following: polyvinyl compounds, polyisopropenyl compounds, acrylic acid esters of polyhydric alcohols, methacrylic acid esters of polyhydric alcohols, unsaturated polyesters such as the maleic anhydride esters of polyhydric alcohols, polydiolefins derived from the conventional 1,2-type polymerization of conjugated $C_4$ to $C_6$ diolefins, such as normally liquid polybutadiene, and the normally liquid or solid copolymeric materials derived from the 1,2 polymerization of conjugated $C_4$ to $C_6$ diolefins with monovinyl substituted mononuclear aromatic compounds, for example, the copolymerization of butadiene with styrene or vinyl toluene produced by conventional sodium polymerization or butyl lithium polymerization; butadiene-methyl methacrylate copolymers; the allyl esters of polybasic acids such as triallyl cyanurate. Additionally, either butyl lithium or sodium catalyzed graft or block polymers or copolymers are useful herein. Here, a prepolymerization of one monomer, i.e., butadiene, is carried out followed by a further polymerization or grafting of the second monomer, i.e., styrene, thereon. These materials range from normally liquid when using up to about 15% styrene, to tacky solids, when using 15 to 25% styrene, to dry solids when using styrene amounts above 25% based on the total reactant monomers. All polymers are characterized by being predominantly of the 1,2-type unsaturation, i.e., having pendant vinyl groups attached to longer chains. Their number average molecular weight ranges from about 1,000 to about 15,000 usually. They are in no sense elastomers but are resinous by nature.

The polyvinyl compounds within the purview of this invention are those monomers which can be illustrated by the following structural formula:

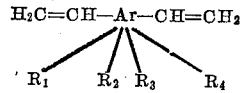

wherein $R_1$, $R_2$, $R_3$ and $R_4$ are each independently selected from the group consisting of hydrogen, halogen, alkyl, and vinyl; and Ar is an aromatic nucleus selected from the group consisting of benzene, naphthalene, biphenyl, anthracene and phenanthrene. Specific examples are divinyl benzene, divinyl toluene, divinyl xylene, divinyl naphthalene, and trivinyl benzene. Divinyl benzene and trivinyl benzene are preferred.

The normally liquid and solid resinous polymeric and copolymeric 1,2-type polyunsaturated hydrocarbons referred to above can be prepared in accordance with the processes outlined in U.S. Patents 2,762,851 and 3,097,108 which disclosures are incorporated herein by reference. Other patents and literature citations could be cited, but these patents are simply exemplary of two methods of producing these conventional, normally liquid and solid polymers and copolymers which have the required degree of 1,2-type olefinic unsaturation and have a number average molecular weight of 15,000 or less. Butadiene-styrene copolymers are preferred.

The simplest member of an acrylic acid ester of a polyhydric alcohol, which is another type of polyfunctional compound useful herein, has the following formula:

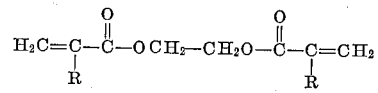

wherein R is selected from the group consisting of hydrogen, halogen, methyl and ethyl. Suitable acids include methacrylic, acrylic, alpha-chloroacrylic, and alpha-bromoacrylic acid. Polyhydric alcohols within the purview of this invention include ethylene glycol, diethylene glycol, propylene glycol-1,2, propylene glycol-1,3, the butanediols, glycerol, 1,1,1-trimethylol propane, and pentaerythritol. The preferred compounds of this class are the dimethacrylate ester of ethylene glycol, the trimethacrylate ester of trimethylol propane, and the tetramethacrylate ester of pentaerythritol.

A curative agent is also incorporated in the polyolefin within the range of 0.5 to 10 parts p.h.p., preferably 2 to 4 p.h.p. The curative is advantageously a free radical organic peroxide type, such as the alkyl, aryl, and aralkyl peroxides, e.g., 2,5 - dimethyl - 2,5 - di(t - butyl peroxy) hexyne-3; 2,5-dimethyl-2,5-di(t-butyl peroxy) hexane, dicumyl peroxide and ditertiary butyl peroxide; alkyl perester peroxides, e.g., ditertiary butyl diperphthalate and tertiary butyl perbenzoate; benzoyl peroxide and mixtures thereof. Any of the organic peroxides capable of generating free radicals conventionally employed as curing agents for rubbers can be used. A low concentration (0.1 to 1.0%) of sulfur may be used to enhance the action of the peroxide. Peroxides alone will effectively cure the alpha-olefinic polymers and give a final product having excellent adhesion of siliceous materials to these polymers where the silane coating of the siliceous materials is of the unsaturated type. Using these same unsaturated silanes also permits the use, in conjunction with the peroxide curing agent, of minor amounts of polyfunctional compounds as hereinafter described or such a curing mixture may be composed of peroxide, polyfunctional compound and elemental sulfur to give a tighter cure. In cases where substituted saturated silanes are used as the initial coating for the siliceous materials, peroxide plus sulfur or peroxide, polyfunctional compound plus sulfur are required in order to secure excellent adhesion of the olefinic polymers to the treated siliceous surfaces and to give the greatest tenacity by the polymers to the glass fibers or glass cords. The two types of silanes employed are as fully identified and disclosed hereinafter.

Besides the polyfunctional compounds and curing agents heretofore described, it is advantageous to incorporate one or more of the following compounding ingredients (per 100 parts of rubber) into the thermoplastic or rubbery alpha-olefinic polymers: 20 to 200 parts of carbon black, e.g., fine furnace black or a like amount of finely divided silica; 1 to 50 parts of zinc oxide; 0.5 to 5 parts of stearic acid; 0.5 to 5 parts of aging inhibitors, e.g., polymerized trimethyl dihydroquinoline (Agerite Resin D); and 10 to 50 parts of plasticizer, e.g., a hydrocarbon plasticizing oil of about 78.0 wt. percent of paraffinic and 22.0 wt. percent of aromatic content having a viscosity of 490 SSU at 100° F. and 57.3 SSU at 210° F. and an aniline point of 216° F., one example of such an oil being known in the trade as Necton 60.

Curing can be performed in any known manner. A suitable method is to place the compounded or reinforced polyolefin in a press mold at a temperature of 250° to 400° F. for 0.5 to 180 minutes at a pressure of 50 to 1500 p.s.i. to provide the desired crosslinked or cured product.

Improved adhesion between either the plastic or rubbery polyolefins and glass fibers or finely divided silica is provided herein. By using the instant polyfunctional unsaturated monomers or polymers as intermediate coatings on glass fibers or silica fillers, new reinforced polyethylene, polypropylene, or similar polymers and copolymers of the 1-olefins are formed.

The polyolefins can be most effectively adhered or bonded to siliceous surfaces, e.g., glass fibers, other silicate, or silica surfaces, by treating the surface with an unsaturated silane or amino alkyl silane or a chrome finishing agent such as methacrylato chromyl chloride or stearato chromyl chloride, and subsequently bonding and curing the compounded polyolefin to the treated surface. Thus, a silane having an alkenyl or amino alkyl group, such as vinyl tri(methoxyethoxy)silane or amino propyl triethoxy silane, is applied as a finish to a glass unit, e.g., glass fibers or to finely divided silica fillers. Those silanes in either aqueous or organic solvent solutions advantageously are applied by dipping or spraying the glass fibers as they are drawn from the spinning bushing. Although silanes or their corresponding silanols or polysiloxanes are preferred, a complex of chromium chloride and methacrylic acid (methacrylato chromyl chloride) known as Volan may also be used herein. An admixture of the polyfunctional compound and the hydrolysis derivative of the silane may be placed in the solution or emulsion used for dipping or spraying the glass fibers or silica filler. The glass or silica with the aforementioned coating or finish thereon, is then contacted with or admixed with the compounded polyolefin, e.g., polyethylene, and subsequently cured, with or without the use of superatmospheric pressure, to provide a unitary end product therefrom. If the polyfunctional compound has been used in the coating bath it is not necessary to also include such compounds in the compounded polyolefins although this may also be done.

The accompanying drawing, in the sole figure, shows a cross sectional view of one type of unitary reinforced end product obtained herein. A siliceous surface, 1, such as glass fabric or other plurality of reinforcing elements of siliceous nature, has a finishing agent, 2, coated thereon, such as an unsaturated silane or an admixture of the silane and a polyfunctional compound. Contiguous to the finishing agent or the admixture coating is a thermoplastic layer, 3, which is a polyolefin alone or an admixture of polyolefin, e.g., polyethylene, and a polyfunctional compound, e.g., divinyl benzene or a normally liquid or solid polymer or copolymer of a $C_4$ to $C_6$ conjugated diolefin and having a plurality of ethylenic (vinyl) groupings The following items are within the broad definition of a siliceous surface: glass fibers, glass flakes, glass plates, ceramics, porcelain, quartz, and finely divided siliceous pigments used in rubber compounding, e.g., ground quartz, fumed silica, precipitated hydrated silica and clays such as kaolin, etc. Finely divided silicas of 0.022 to 10 microns average particle size are particularly useful. Glass fibers include yarns, rovings, strands, reinforcing mats, staple yarns, woven fabrics, woven rovings, cord, and chopped rovings.

A suitable silane finish for the instant invention is defined by the following general structure:

wherein $R_1$ is selected from the group consisting of alkenyl, aminoalkyl, epoxyalkyl, epoxy aryl, epoxy aralkyl, epoxy cycloalkyl, mercapto alkyl, acryl oxyalkyl, and methacryloxyalkyl; X is selected from the group consisting of halogen, hydroxyl, and alkoxy; and $R_2$ and $R_3$ are each independently selected from the group consisting of $R_1$, X, and methyl. Specific suitable compounds within the above structure are as follows: amino-propyl-triethoxysilane, amino-ethyl-triethoxysilane, amino-methyl-triethoxysilane, amino-propyl-trimethoxysilane, gamma acryl oxypropyl trimethoxysilane, beta methacryl oxyethyl trimethoxysilane, gamma acryl oxypropyl triethoxysilane, gamma methacryloxypropyl trimethoxysilane, gamma methacryloxypropyl dimethyl chlorsilane, beta (methacryloxyethoxy) propyl trimethoxysilane, gamma methacryloxypropyl methyl diacetoxysilane, vinyl trichlorosilane, vinyl dimethyl chlorosilane, vinyl tris-2-methoxyethoxy silane, allyl silanes, gamma glycidoxypropyl trimethoxysilane; beta(3,4-epoxy cyclohexyl)ethyl trimethoxysilane; beta glycidoxyethyl triethoxysilane; beta (3,4-epoxy cyclohexyl)ethyl tri(methoxyethoxy)silane; beta(3-epoxyethyl phenyl)ethyl trimethoxysilane; glycidoxy phenyl dimethyl methoxysilane; beta(epoxyethyl) ethyl triethoxysilane; 4,5-epoxy-n-hexyl trimethoxysilane; 7,8-epoxy-n-octyl tripropoxy silane; 15,16-epoxy-n-hexadecyl trimethoxysilane; 3-methylene, 7-methyl-6,7-epoxy octyl trimethoxysilane; beta mercaptoethyl trimethoxysilane; gamma mercaptopropyl triethoxysilane; gamma mercaptopropyl trimethoxy-silane; beta(2-mercapto cyclohexyl)ethyl trimethoxysilane; beta mercaptoethyl triethoxysilane; gamma mercaptopropyl dimethyl methoxysilane; beta mercaptoethyl triacetoxysilane; and the like. All of these silanes are believed to be effective upon being contacted even with minute amounts of water and are thus at least partially converted into the corresponding silanols which may also be partially converted into their condensation polymers, the polysiloxanes. Condensation products of the hydrolyzed or partially hydrolyzed silane esters (polysiloxanes) as well as the silanols are usually believed to be employed as a practical matter but they are all grouped together and defined as "silanes" for purposes of convenience herein and in the attached claims. The instant silanes are effectively applied to the siliceous surface, e.g., glass fibers, as a solution of the silanes in a hydrocarbon solvent, such as hexane or heptane, or as a solution or emulsion of the silanols in water at 0.5 to 5.0 wt. percent concentration in the liquid. Coatings of 0.03% to 1% based on the siliceous material, preferably about 0.5% are provided thereon.

Another finishing agent, besides a silane, which can be applied to the surface of a siliceous material is the chrome-type finish. Broadly, it is a Werner-type compound in which methacrylic acid is coordinated with chromium chloride to form a complex therefrom. A specific structure (Volan A) is as follows:

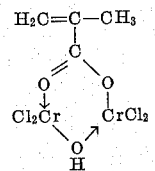

The methods for applying this finish to the glass and the thickness thereon are the same as for silane finishes as above set forth.

As stated above, solution or emulsions of the silanes alone, or admixed with polyfunctional compounds, may be employed in the concentrations previously mentioned for contacting the siliceous surfaces such as finely divided silica fillers or multiple or single glass fibers. It is convenient and practical however to include in the silane emulsion or cement, a small amount of a free radical peroxide curing catalyst, i.e., 0.5 to 3.0 wt. percent; and to include from 1 to 10% of the liquid (emulsion) of the polyfunctional hydrocarbon liquid or solid monomers or resinous polymers which act as coupling agents to aid in the ultimate bonding of the polyolefins to the siliceous surfaces. Any suitable emulsifying agent, for example, of the non-ionic type, such as a polyethylene oxide condensate of nonyl phenol in an amount of between about 0.1 and about 1.0% by weight does not adversely affect the ultimate bonding interfaces and does aid in securing good wetting of emulsion components on the glass fibers or silica filler particles especially when polymers or copolymers are the polyfunctional compounds employed. A sequence of dipping baths or applicator felt rollers each containing one or more of the aforementioned three components (silane, polyfunctional compound, peroxide) may be sequentially used for treating the siliceous surfaces (glass fibers, for example) and the polyolefins may likewise be admixed (compounded) as by use of a Banbury mixing operation with peroxide, solid or liquid resinous hydrocarbon coupling agents and/or the polyolefin surfaces may be dipped, sprayed, or brushed with any one or all three of these types of reactants, without regard to whether or not the siliceous surfaces were treated only with the silanes or additionally with the peroxide and/or polyfunctional coupling compounds. From about 1 to 10% by weight concentration of the polyolefins may be made into cements or emulsions or placed in like amount directly into the treating baths for the siliceous materials and thus obtain glass fibers or silica fillers having coatings containing polyolefins which articles will adhere to the same polyolefins or other polyolefins with improved tenacity. Silanes in an amount of up to about 1 wt. percent may be incorporated into or brushed on the surfaces of the polyolefins as well although, generally speaking, this is not needed where the siliceous surfaces have been subjected to such treatment. Glass fiber monofilaments subjected to the aforementioned treating baths either before or after heat treatment to partially or completely cure the coating are formed into strands and then cords which find special utility as tire cords in the manufacture of reinforced belts, hose and tires especially where polyolefins such as ethylene-propylene rubbery copolymers are to be adhered to the so treated and formed fiber glass cords.

The compounded polyolefin and silane or chrome finished glass or silica may be contiguously placed in conventional vulcanizing equipment, e.g., a press or autoclave, or in the case of silica filler, it may be milled in with a Banbury mixer and then heated at a temperature between 250° and 400° F., preferably 300° to 330° F. for 0.5 to 180 minutes, preferably 10 to 60 minutes, and cured, under pressure, of about 5 to about 1500 p.s.i.g., preferably 50 to 600 p.s.i.g.

Accordingly, an end product is formed in which there is a strong chemical bond between the siliceous surfaces, e.g., glass fiber or silica filler particle, and the polyolefin. This unitary product has the following utility: tire carcass, reinforced hose, reinforced belting, household appliance parts or electrical insulation prepared from the rubbery copolymers. Reinforced laminates in combination with hydrocarbon thermosetting resins or using only thermoplastic resins can be formed from the polyolefins.

The following examples are submitted to illustrate but not limit this invention. Unless otherwise indicated, all parts and percentages in the specification are based upon weight.

EXAMPLE 1

Polyethylene, 100 parts thereof, was compounded with various ingredients as indicated in Table I.

TABLE I

|  | A | B | C | D | E | F |
|---|---|---|---|---|---|---|
| Polyethylene [1] | 100 | 100 | 100 | 100 | 100 | 100 |
| MT Black [2] | 50 | 50 | 50 | 50 | 50 | 50 |
| Parabar 441 [3] | 0.5 | 0.5 | 0.5 | 0.5 | 0.5 | 0.5 |
| Divinyl benzene |  |  | 5 | 5 |  |  |
| Ethylene dimethacrylate |  |  |  |  | 5 |  |
| Triethylene glycol dimethacrylate |  |  |  |  |  | 5 |
| Dicup 40 HAF [4] |  | 5 |  | 5 | 5 | 5 |

[1] Low density-type prepared at high pressure.
[2] Medium thermal black.
[3] 2,6-di-t-butyl-p-cresol.
[4] Dicumyl peroxide, 40% concentration on a furnace black.

Each of the polyethylene compounds listed was formed into sheets with a thickness of 1/8 of an inch and subsequently cut into squares, 6 in. x 6 in. Sandwich type laminates were then prepared using 181 weave glass fabric between two layers of the rubber. Layers of canvas backing were then placed on the outside of each rubber layer and the entire laminate was cured under pressure at 307° F. for 40 minutes. This procedure was employed, firstly, with glass fabric having no finish thereon (heat cleaned only), and, secondly, with A-172 (vinyl silane ester of the monomethyl ether of ethylene glycol) finish thereon. The laminates were subsequently cut into one inch wide strips and the force required to pull the canvass-rubber layer from the glass cloth was determined. The bond strengths for the six compounds listed in Table I are as follows:

| Compound | A | B | C | D | E | F |
|---|---|---|---|---|---|---|
| Bond Strength (lb./in.): |  |  |  |  |  |  |
| With finish on fabric | 4 | 14 | 3 | 31 | 26 | 33 |
| No finish on fabric | 2.5 | 2.5 | 2.5 | 3.5 | 3.0 | 3.5 |

It is noteworthy that the use of any of the three polyfunctional monomers in combination with a peroxide, substantially improved the adhesion of polyethylene to glass.

EXAMPLE 2

Thermoplastic materials G, H, I, J, and K were prepared by incorporating the following compounding ingredients into 100 parts of polyethylene:

| Compound | G | H | I | J | K |
|---|---|---|---|---|---|
| Polyethylene | 100 | 100 | 100 | 100 | 100 |
| Thermax [1] | 50 | 50 | 50 | 50 | 50 |
| Parabar 441 | 0.5 | 0.5 | 0.5 | 0.5 | 0.5 |
| Divinyl benzene |  |  | 5 |  |  |
| Ethylene dimethacrylate |  |  |  |  |  |
| Triethylene glycol dimethacrylate |  |  |  | 5 |  |
| Dicup 40 HAF |  | 5 | 5 | 5 | 5 |

[1] Thermal carbon black.

Each of the above compounded polymers were laminated and cured in a press mold with 181 weave-glass fabric with and without a Volan–A finish thereon as per Example 1. Curing was accomplished at a temperature of 307° F. for 45 minutes with a pressure of 520 p.s.i. The adhesion of each cured item was determined (in lb./in.) by a test (same as used in Example 1) wherein pulling occurred at a separation rate of 2 in./min. with the following results:

| Compound | No finish on fabric | | With finish on fabric | |
|---|---|---|---|---|
|  | Tested at 76° F. | Tested at 212° F. | Tested at 76° F. | Tested at 212° F. |
| G | 2.5 | 1.0 | 2.0 | 1.5 |
| H | 2.5 | 1.5 | 10.0 | 6.0 |
| I | 3.5 | 0.5 | 22.5 | 17.5 |
| J | 3.0 | 1.5 | 22.5 | 16.0 |
| K | 3.5 | 1.5 | 23.0 | 18.5 |

The above data indicate that a chemical finish, such as Volan–A, is necessary on the surface of the glass in order to obtain a suitable adhesive strength between glass and a cross-linked polyethylene. The adhesion is increased more than 100% when 5 parts of a polyfunctional monomer are included in the plastic compound with a peroxide therein. Although the vinyl silane-finish is preferred as shown in Example 2, a chrome finish, e.g., Volan–A, is also effective for the instant invention.

EXAMPLE 3

A rubbery copolymer was prepared containing 34 mole percent ethylene with 66 mole percent propylene. This copolymer was compounded, laminated, cured and tested for adhesion properties. The data are shown in Table II.

TABLE II

|  | Q | R | S | T | U | V | W | X |
|---|---|---|---|---|---|---|---|---|
| Ethylene-propylene copolymer | 100 | 100 | 100 | 100 | 100 | 100 | 100 | 100 |
| FF black | 50 | 50 | 50 | 50 | 50 | 50 | 50 | 50 |
| Zinc oxide | 5 | 5 | 5 | 5 | 5 | 5 | 5 | 5 |
| Stearic acid | 1 | 1 | 1 | 1 | 1 | 1 | 1 | 1 |
| Dicup 40 HAF |  | 5 | 5 | 5 | 5 | 5 | 5 | 5 |
| Divinyl benzene |  |  | 5 | 10 |  |  |  |  |
| Ethylene dimethacrylate |  |  |  |  | 5 | 10 |  |  |
| Propane trimethacrylate |  |  |  |  |  |  | 5 | 10 |

Each of the uncured compounded polymers was placed in a press mold adjacent to 181 weave glass fabric having a vinyl silane finish derived from the hydrolysis of the vinyl silane ester of the monoethyl ether of ethylene glycol (A-172) as a finishing agent thereon. The adjacent layers were subsequently cured at a temperature of 307° F. for 40 minutes in a comparable manner as described in Example 1. The adhesion (lb./in.) of each cured product was found to be as follows:

| Q | R | S | T | U | V | W | X |
|---|---|---|---|---|---|---|---|
| 2 | 11 | 15 | 25 | 13 | 24 | 17 | 19 |

It is manifest that by compounding the above copolymer with both a polyfunctional compound and a peroxide compound, a superior product is obtained therefrom.

EXAMPLE 4

A copolymer of ethylene with propylene was provided and compounded with various ingredients. The compounded copolymers were then used to determine the physical properties of the cured item, per se, and in conjunction with glass fabric, Table III.

TABLE III

|  | 1 | 2 | 3 | 4 |
|---|---|---|---|---|
| Ethylene-propylene [1] | 100 | 100 | 100 | 100 |
| FF black | 50 | 50 | 50 | 50 |
| Zinc oxide | 5 | 5 | 5 | 5 |
| Stearic acid | 1 | 1 | 1 | 1 |
| Dicup 40 HAF | 5 | 5 | 5 | 5 |
| Necton 60 [2] | 10 | 10 | 10 | 10 |
| Ethylene dimethacrylate |  | 5 |  |  |
| Divinyl benzene |  |  | 5 |  |
| Butyl methacrylate |  |  |  | 5 |
| Cured for 20 minutes at 307° F.: |  |  |  |  |
| Tensile (p.s.i.) | 530 | 1,275 | 1,185 | 340 |
| Elongation (percent) | 670 | 670 | 560 | 450 |
| 300% Modulus (p.s.i.) | 360 | 520 | 620 | 300 |
| Hardness (Shore A) | 61 | 62 | 64 | 61 |
| Tear (lbs./in.) | 120 | 180 | 160 | 95 |
| Adhesion to HG-28 weave/A-172 silane finish glass fabric (lb./in.) | 9 | 24 | 16 | 5 |
| Cured for 40 minutes at 307° F.: |  |  |  |  |
| Tensile (p.s.i.) | 760 | 1,375 | 1,290 | 520 |
| Elongation (percent) | 575 | 515 | 450 | 400 |
| 300% Modulus (p.s.i.) | 550 | 700 | 840 | 390 |
| Hardness (Shore A) | 65 | 67 | 68 | 63 |
| Tear (lb./in.) | 155 | 160 | 170 | 105 |
| Adhesion to HG-28/A-172 glass fabric (lb./in.) | 9 | 20 | 15 | 6 |

[1] 56 wt. percent ethylene and 44 wt. percent propylene copolymer—Mooney viscosity (ML) 212° F./8 minutes of 44.
[2] A petroleum oil of the lubricating grade type.

The use of the difunctional monomers, e.g., ethylene dimethacrylate and divinyl benzene improved overall physical properties and adhesion to the glass fabric. It should be noted that a monofunctional monomer, e.g., butyl methacrylate, is actually harmful to both the physical properties of the vulcanizate and its adhesion to the silane-finished glass.

EXAMPLE 5

Compound No. 1 in Table III was employed to determine the effect of brushing the monomer onto the sheet of ethylene-propylene compound as a thin layer before contacting it with glass fabric. The results are as follows:

*Adhesion (lb./in.) to glass fabric, with A-172 silane thereon after being cured 20 min. at 307° F.*

No monomer used _____ 9

With the following monomers brushed thereon:

Butylene dimethacrylate _____ 20
Ethylene dimethacrylate _____ 19
Divinyl benzene _____ 13
Butyl methacrylate _____ 6

It is noted that this technique gives comparable results as compared to the procedure of mixing the monomer with the rubbery compound.

The adhesion tests with glass fabric containing an amino silane were also performed with compound 1 (Example 4) in which ethylene dimethacrylate monomer was brushed onto the surface of some of the rubber compounds. These tests gave the following values:

*Adhesion (lb./in.) to glass fabric with amino-propyl-triethoxy silane (A-1100) thereon*

No monomer used _____ 3
Ethylene dimethacrylate _____ 8

EXAMPLE 6

The same ethylene-propylene rubbery copolymer as described in Example 4 (56 wt. percent combined ethylene) was further tested with various components therein as shown below:

| Components | A | B | C | D |
|---|---|---|---|---|
| Ethylene-propylene copolymer | 100 | 100 | 100 | 100 |
| SRF Black [1] | 50 | 50 | 50 | 50 |
| Magnesium oxide | 5 | 5 | 5 | 5 |
| Zinc oxide | 5 | 5 | 5 | 5 |
| Stearic acid | 1 | 1 | 1 | 1 |
| Dicup 40 HAF | 5 | 5 | 5 | 5 |
| Necton 60 | 10 | 10 | 10 | 10 |
| Ethylene dimethacrylate |  | 5 |  | 5 |
| Sulfur |  |  | 0.25 | 0.25 |

[1] Semi-reinforcing furnace carbon black.

Laminated test samples were prepared with HG-28 glass fabric containing the chrome finish (Volan-A), vinyl silane (A-172), and amino silane (A-1100). The laminates were cured at 307° F. for 20 minutes.

| Finish Employed | Adhesion (pounds per inch) | | | |
|---|---|---|---|---|
|  | A | B | C | D |
| Volan A | ([1]) | 11 | 2 | 7 |
| A-172 | ([1]) | 17 | 11 | 25 |
| A-1100 | ([1]) | 28 | 14 | 36 |

[1] Undercured.

The above data demonstrate that if magnesium oxide, or its equivalent, e.g., magnesium hydroxide or carbonate, is used, improved adhesion to glass is obtained with the amino silane type as compared to the vinyl silane. The concentration of the magnesium compound is advantageously from 0.5 to 50 parts per 100 parts of polymer, preferably 1 to 10 parts. However, it is evident that a polyfunctional monomer, e.g., ethylene dimethacrylate, improves adhesion with all of the finishes. Moreover, the addition of a small concentration of sulfur is also beneficial if magnesium oxide is used, and it can range from 0.05 to 2 parts, preferably 0.1 to 0.3 part p.h.p. In lieu of all or part of the elemental sulfur, a sulfur bearing rubber vulcanization accelerator can be utilized, e.g., tetramethyl thiuram disulfide, benzothiazyl disulfide, zinc dimethyl dithiocarbamate and the like.

EXAMPLE 7

A rubbery copolymer of ethylene with propylene composed of a copolymer of 44 wt. percent ethylene and 56 wt. percent propylene having a Mooney viscosity ML 212° F./8 minutes of about 40 was compounded with zinc oxide and Hi-Sil 233 (a hydrated silica of 0.022 micron average particle size), as well as other ingredients as shown in the following Table IV. The compounding was carried out in a Banbury mixer until the batch was homogenous. All parts shown are per 100 parts of ethylene-propylene rubbery copolymers.

TABLE IV

|  | 1 | 2 | 3 | 4 | 5 | 6 | 7 |
|---|---|---|---|---|---|---|---|
| Ethylene-propylene rubbery copolymer | 100 | 100 | 100 | 100 | 100 | 100 | 100 |
| Hi-Sil 233 [1] | 60 | 60 | 60 | 60 | 60 | 60 | |
| Dixie clay [2] | | | | | | | 60 |
| ZnO | 5 | 5 | 5 | 5 | 5 | 5 | 5 |
| Ethylene dimethacrylate | 3 | | | | | | |
| Polybutadiene (liquid) M.W. 2,700 | | 10 | | 10 | 5 | 5 | 10 |
| A-172 (vinyl silane) | | | | | | 0.5 | 1.0 |
| DiCup 40C [3] | 6.75 | 4.0 | 4.0 | 4.0 | 4.0 | 4.0 | 5.0 |
| Benzoyl peroxide | | | | | | | 2.0 |
| Sulfur | | | | 0.32 | | | |
| Cured at 320° F. for 20 minutes: | | | | | | | |
| Tensile strength, p.s.i. | 2,060 | 2,030 | 850 | 1,340 | 1,650 | 2,200 | 1,100 |
| Elongation, percent | 530 | 610 | 1,000 | 1,100 | 830 | 500 | 350 |
| 300% Modulus, p.s.i. | 1,055 | 925 | 240 | 310 | 440 | 910 | 935 |
| Cured at 320° F. for 30 minutes: | | | | | | | |
| Tensile strength, p.s.i. | | | | | 1,900 | 2,100 | 1,130 |
| Elongation, percent | | | | | 880 | 465 | 935 |
| 300% Modulus, p.s.i. | | | | | 440 | 1,000 | 1,000 |

[1] Hydrated silica of 0.022 micron average particle size.
[2] A kaolin hard clay, 99.8% through 325 mesh.
[3] 40% dicumyl peroxide on CaCO₃.

From the above data, using normally liquid polybutadiene polymeric oil as the polyfunctional compound, it is apparent much less peroxide curing agent is required to achieve good tensile cured strength, or with the usual amount of peroxide a much shorter curing time is required to achieve good tensile strengths (cured). Improved (decreased) elongation likewise results without the use of sulfur (Run 4 vs. Run 2) which is also objectionable because it imparts, oftentimes, an objectionable odor to the final product. The use of a vinyl silane markedly improves bond and tensile strengths as compared to runs wherein no silane treat was employed (Run 6 vs. Run 5). The use of the polybutadiene polymer (Run 2), using about 50% less peroxide, gave about the same final physical properties as those obtained with ethylene dimethacrylate (Run 1) using normal amounts of peroxide. Run 3 shows a low cured tensile strength where no polybutadiene and no silane was used.

From the above data the beneficial effect of using polyfunctional compounds is quite apparent, e.g., ethylene dimethacrylate as in Run 1 or liquid polybutadiene as in Runs 2 and 5 vs. Run 3. Sulfur may be used to augment the cure of ethylene-propylene rubber and it can be used in conjunction with most polyfunctional compounds as illustrated using ethylene dimethacrylate (Examples 6B, C and D). The use of a vinyl silane markedly improves the cured strength (Run 6 vs. Run 5). Clays are normally not as effective as the more highly siliceous fillers for reinforcing ethylene-propylene copolymer rubber, but Run 7 illustrates a composition in which clay was useful as a filler in such rubber.

EXAMPLE 8

100 parts by weight of a rubbery copolymer of 44 wt. percent ethylene with 56 wt. percent of propylene having a Mooney viscosity, ML 212° F./8 minutes, of about 40, was compounded with about 50 parts by weight of (SRF) semi-reinforcing furnace carbon black, about 1 part of stearic acid, about 5 parts of dicumyl peroxide (40% concentration on a high abrasion furnace carbon black), about 0.25 part of elemental sulfur and about 5 parts of ethylene dimethacrylate (polyunsaturated vinyl-type monomer).

Test panels of this compounded mixture were adhered to glass cloth HG-28/112 of taffeta weave which had been heat cleaned and then treated with a 1.5% benzene solution of 3,4-epoxy cyclohexylethyl-trimethoxysilane by immersion for about one minute and then air dried. The adhesion test panels were then press cured for 40 minutes at 307° F. under 500 p.s.i.g. and pulled apart at the rate of 2 inches per minute. The bond strength was 53 pounds per inch to break or separation.

An identical set of test panels were prepared and tested as above described except that the silane used was glycidoxypropyl-trimethoxysilane. The adhesion strength was 50 pounds per inch to break or separation.

EXAMPLE 9

100 parts of a rubbery copolymer of 44 wt. percent ethylene with 56 wt. percent of propylene having a Mooney viscosity, ML 212° F./8 minutes, of about 40, was compounded with 50 parts of semi-reinforcing furnace carbon black, 5 parts of MgO, 1 part of stearic acid, 5 parts of dicumyl peroxide (40% concentration on a high abrasion furnace carbon black), 0.25 part of sulfur and 5 parts of the polyfunctional monomer, ethylene dimethacrylate. Test panels of this compounded mixture were adhered to HG-28 fiber glass cloth which was first treated in one of six different ways and the laminates cured for 40 minutes at 307° F. after which the adhesive bond between the glass fabric and the rubber was measured in pounds of pull to break or separation, as before described. The treatments of the glass fabric were:

(1) A 2% aqueous solution in 0.05% acetic acid of beta mercaptoethyl trimethoxy silane.

(2) A 1% solution of (1).

(3) A 4% aqueous emulsion of a 30 mole percent styrene-butadiene solid resinous copolymer of about 15,000 molecular weight of more than 50% 1,2-type unsaturation containing 1% of the same beta mercaptoethyl trimethoxysilane.

(4) Same as (3) but also containing 2% of dicumene peroxide based on copolymer resin.

(5) The same mercapto silane as before but treated with only enough water to hydrolyze one-third of its hydrolyzable groups and used as a 1.5% solution in toluene.

(6) No treatment of HG-28 except it was water washed and dried.

In cases 1 through 5, the pounds of adhesion varied between 25.5 and 29.5 and in all cases the failure occurred in the rubber itself and not at the glass fabric-rubber interface. The control (6) failed at less than 2 lbs. of pull.

EXAMPLE 10

100 parts of a low density type of polyethylene similar to that shown in Example 1, 60 parts of thermal carbon black and 2.5 parts of dicumyl peroxide were compounded and formed into test panels which were then pressed and adhered to and laminated with HG-28 fiber glass cloth which had first been treated in various ways as hereinbelow described. The laminated test panels were cured at 320° F. for forty minutes and adhesion pull tested as hereinbefore described.

The HG-28 heat cleaned glass cloth was washed with 1% aqueous acetic acid, water washed, and dried at 250° F. Four different glass cloth samples were then treated as follows:

(a) A 1% aqueous solution of A-172 (vinyl silane as previously identified) followed by air drying and then heating at 200° F. for 30 minutes.

(b) Treated as in (a) followed by painting or brushing on divinyl benzene (55% concentration) which contained 1% of dicumyl peroxide.

(c) A 1% aqueous solution of gamma methacryloxypropyl trimethoxysilane followed by air drying and then heating at 200° F. for 30 minutes.

(d) Treated as in (c) followed by painting or brushing on divinyl benzene (55% concentration) containing 1% dicumyl peroxide.

The adhesion test pulls, in pounds, were:

(a) _____ 23
(b) _____ >56
(c) _____ 27
(d) _____ 35

The unheated glass cloth had a pull test of less than 5 lbs.

In (b) separation took place within the polyethylene rather than at the interface of the glass cloth and polyethylene. Some crosslinking or reaction between the silane and the divinyl benzene probably occured in test (d) which explains why the adhesion pull test was not higher than it actually was. A lower curing temperature and/or using less peroxide would result in higher adhesion.

EXAMPLE 11

100 parts of ethylene-propylene copolymer (40 wt. percent ethylene, 60 wt. percent propylene, Mooney viscosity ML 212° F., 8 minutes was 40) was compounded with 50 parts of SRF black, 10 parts of Necton 60 hydrocarbon plasticizing oil, 5 parts of ZnO, 1 part of calcium stearate, 5 parts of Dicup 40 HAF (see Table I) and 0.25 part of sulfur.

Three separate specimens of HG-28 heat cleaned glass cloth as described in the preceding example were treated as follows:

(a) A 1% aqueous solution of gamma methacryloxypropyl trimethoxysilane followed by air drying and then heating at 200° F. for 30 minutes.

(b) Treated as in (a) followed by painting or brushing on divinyl benzene (55% concentration) containing 1% dicumyl peroxide.

(c) Same as (a) followed by treatment with a toluene solution of 4 parts normally liquid polybutadiene prepared by sodium polymerization, 0.08 part of dicumyl peroxide, 0.08 part of 2,5-dimethyl-2,5-di(tertiary butyl peroxy) hexane, and 96 parts of toluene after which the treated cloth was air dried to allow the toluene to evaporate and then the cloth was heated for 10 minutes at 200° F.

Test panels of the compounded rubber were laminated with the various treated glass cloths, and each then cured for thirty minutes at 307° F.

The pull tests, in pounds, were as follows:

(a) _____ 16
(b) _____ 34
(c) _____ 25
Untreated cloth _____ <5

Both monomeric and polymeric polyfunctional compounds markedly increased the degree of adhesion. In practical operations, however, as in the coating of glass fibers as formed or when in the form of strands, the use of treatment (c) involving normally liquid polybutadiene is preferred because of its non-volatile nature and the fact that it may be more conveniently coated on the silane treated glass fibers prior to the time that a rubber fabricator would employ it in the form of cord.

Having now set forth the general nature and specific embodiments of the present invention, the true scope of the invention is now particularly pointed out in the appended claims.

What is claimed is:

1. A process for reinforcing rubbery copolymers which comprises:

(A) treating the surfaces of a siliceous reinforcing element with an organo silane having the general formula:

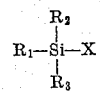

wherein:
$R_1$ is selected from the group consisting of alkenyl, amino alkyl, epoxyalkyl, epoxyaryl, epoxyaralkyl, epoxycycloalkyl, mercaptoalkyl, acryloxyalkyl and methacryloxyalkyl, $R_2$ and $R_3$ are each independently selected from the group consisting $R_1$, X and methyl, and X is selected from the group consisting of halogen, hydroxyl and alkoxy; and (B) compounding a saturated rubbery copolymer of ethylene and a $C_2$–$C_{12}$ alpha alkene with:

(1) 3 to 10 wt. percent based on said rubbery copolymer of a polyfunctional compound having at least 2 terminal ethylenically unsaturated carbon to carbon linkages per molecule, and (2) 0.5 to 10 wt. percent, based on said copolymer of at least one organic peroxide; and (C) curing said treated reinforcing element in contact with said compounded rubbery copolymer at a temperature of 250 to 400° F. for from 0.5 to 180 minutes at a pressure of 50 to 1500 p.s.i.

2. A process as in claim 1 wherein the rubbery copolymer is a copolymer of ethylene and propylene.

3. A process as in claim 1 wherein the polyfunctional compound is selected from the group consisting of polyvinyl aryl monomers, acrylic acid esters of polyhydric alcohols, methacrylic acid esters of polyhydric alcohols, unsaturated polyesters of unsaturated dicarboxylic acids and anhydrides with polyhydric alcohols, normally liquid and solid hydrocarbon polymers, obtained by the 1,2 polymerization of $C_4$ to $C_6$ conjugated diolefins and normally liquid and solid hydrocarbon copolymers obtained by the 1,2 copolymerization of $C_4$ to $C_6$ conjugated diolefin with a monovinyl substituted mononuclear aromatic compound, said hydrocarbon polymers and hydrocarbon copolymers having a molecular weight of 15,000 and below and containing at least 50% of the 1,2-type (vinyl) unsaturation therein.

4. A process as in claim 1 wherein the siliceous reinforcing elements are finely divided silica particles.

5. A process as in claim 1 wherein the siliceous reinforcing elements are glass fibers.

6. The reinforced rubbery copolymer prepared according to the process of claim 1.

7. Rubbery copolymer-coated glass fibers comprising:

(A) glass fibers whose surfaces are initially treated with an organo silane having the general formula:

wherein:
$R_1$ is selected from the group consisting of alkenyl, aminoalkyl, epoxyalkyl, epoxyaryl, epoxyaralkyl, epoxycycloalkyl, mercaptoalkyl, acryloxyalkyl and methacryloxyalkyl, $R_2$ and $R_3$ are each independently selected from the group consisting or $R_1$, X, and methyl, and X is selected from the group consisting of halogen, hydroxyl, and alkoxy; and (B) whose so-treated surfaces are coated with a mixture of a saturated rubbery copolymer of ethylene and $C_2$–$C_{12}$ alpha alkene and 3 to 10 wt. percent, based on said rubbery copolymer, of a polyfunctional compound selected from the group consisting of polyvinyl aryl monomers, acrylic acid esters of polyhydric alcohols, methacrylic acid esters of polyhydric alcohols, unsaturated polyesters of unsaturated dicarboxylic acids and anhydrides with polyhydric alcohols, normally liquid and solid hydrocarbon polymers, obtained by the 1,2 polymerization of $C_4$ to $C_6$ conjugated diolefins and normally liquid and solid hydrocarbon copolymers obtained by the 1,2 copolymerization of $C_4$–$C_6$ conjugated diolefin with a monovinyl substituted mononuclear aromatic compound said hydrocarbon polymers and hydrocarbon copolymers having a molecular weight of 15,000 and below and containing at least 50% of the 1,2-type (vinyl) unsaturation therein; and (C) said coated glass fibers thereafter cured in the presence of 0.5 to 10 wt. percent, based on said rubbery copolymer, of at least one organic peroxide at a temperature of 250 to 400° F. and a pressure of 50 to 1500 p.s.i. for from 0.5 to 180 minutes.

8. Rubbery copolymer-coated glass fibers comprising:
(A) glass fibers whose surfaces are initially treated with an organo silane having the general formula:

wherein:
$R_1$ is selected from the group consisting of alkenyl, aminoalkyl, epoxyalkyl, epoxyaryl, epoxyaralkyl, epoxycycloalkyl, mercaptoalkyl, acryloxyalkyl and methacryloxyalkyl, $R_2$ and $R_3$ are each independently selected from the group consisting of $R_1$, X and methyl, and X is selected from the group consisting of halogen, hydroxyl, and alkoxy; and (B) whose so-treated surfaces are then contacted with a sheet of a saturated rubbery copolymer of ethylene and a $C_2$–$C_{12}$ alpha alkene which sheet has been coated with a polyfunctional compound selected from the group consisting of polyvinyl aryl monomers, acrylic acid esters of polyhydric alcohols, methacrylic acid esters, polyhydric alcohols, unsaturated polyesters of unsaturated dicarboxylic acids and anhydrides with polyhydric alcohols, normally liquid and solid hydrocarbon polymers, obtained by the 1,2 polymerization of $C_4$ to $C_6$ conjugated diolefins and normally liquid and solid hydrocarbon copolymers obtained by the 1,2 copolymerization of $C_4$ to $C_6$ conjugated diolefin with a monovinyl substituted mononuclear aromatic compound, said hydrocarbon polymers and hydrocarbon copolymers having a molecular weight of 15,000 and below and containing at least 50% of the 1,2-type (vinyl) unsaturation therein; and (C) said coated glass fibers thereafter cured in the presence of 0.5 to 10 wt. percent, based on said rubbery copolymer, of at least one organic peroxide at a temperature of 250 to 400° F. and a pressure of 50 to 1500 p.s.i. for from 0.5 to 180 minutes.

9. Glass fibers as in claim 7 whose surfaces are initially coated with a mixture of said organo silane and said polyfunctional compound.

10. Glass fibers as in claim 7 whose so treated surfaces further contain a coating of an admixture of a rubbery copolymer of ethylene and a $C_2$–$C_{12}$ alpha alkene, and an organic peroxide.

11. Glass fibers as in claim 7 wherein the rubbery copolymer is a copolymer of ethylene and propylene.

References Cited by the Examiner

UNITED STATES PATENTS

| | | | |
|---|---|---|---|
| 2,928,802 | 3/1960 | Rehner et al. | 260—41.5 |
| 3,012,020 | 12/1961 | Kirk et al. | |
| 3,013,915 | 12/1961 | Morgan | 156—307 |
| 3,097,150 | 7/1963 | Ranier et al. | |
| 3,194,849 | 7/1965 | Natta et al. | |

FOREIGN PATENTS

| | | |
|---|---|---|
| 232,313 | 1/1961 | Australia. |
| 569,958 | 1/1959 | Belgium. |

MORRIS LIEBMAN, *Primary Examiner.*

K. B. CLARKE, J. S. WALDRON, *Assistant Examiners.*